Oct. 1, 1935.  R. N. VICKERS  2,015,978
POSITIVE LOCK WRIST PIN AND CRANK
Filed Sept. 14, 1934
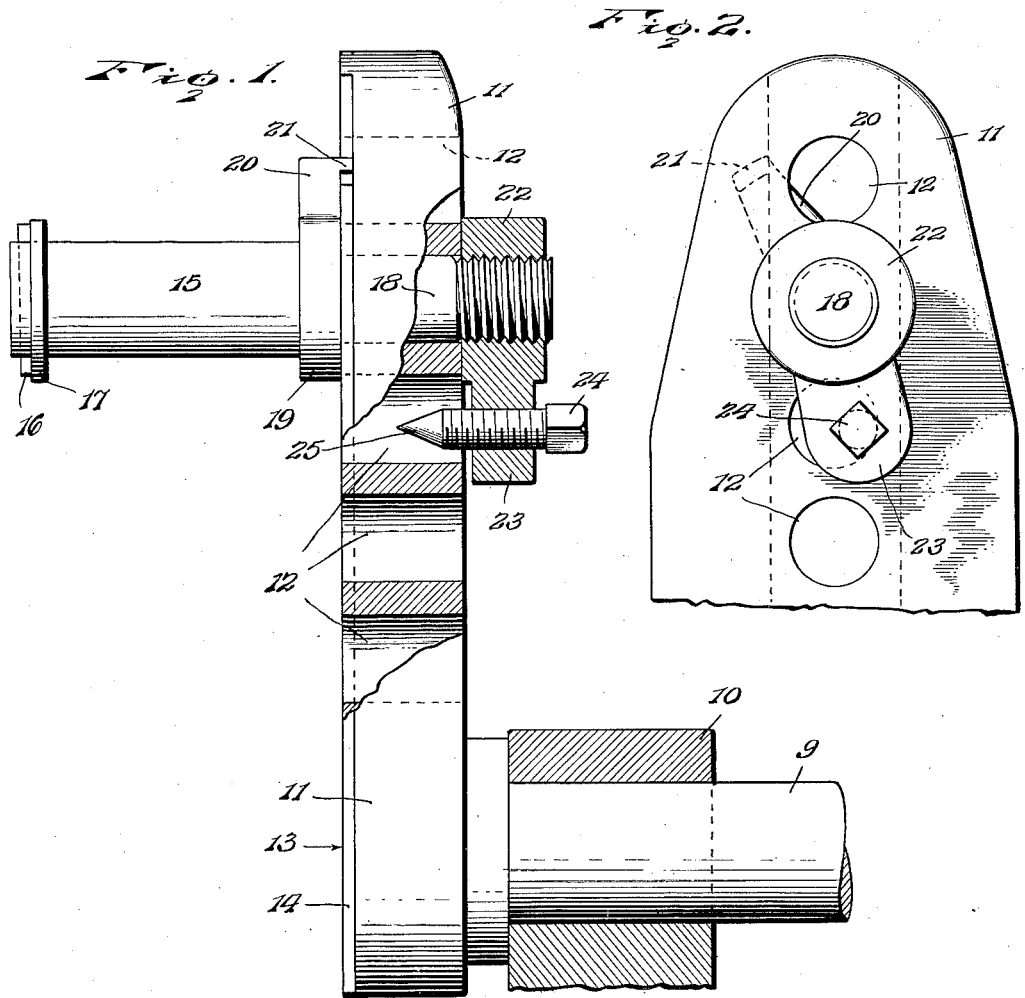
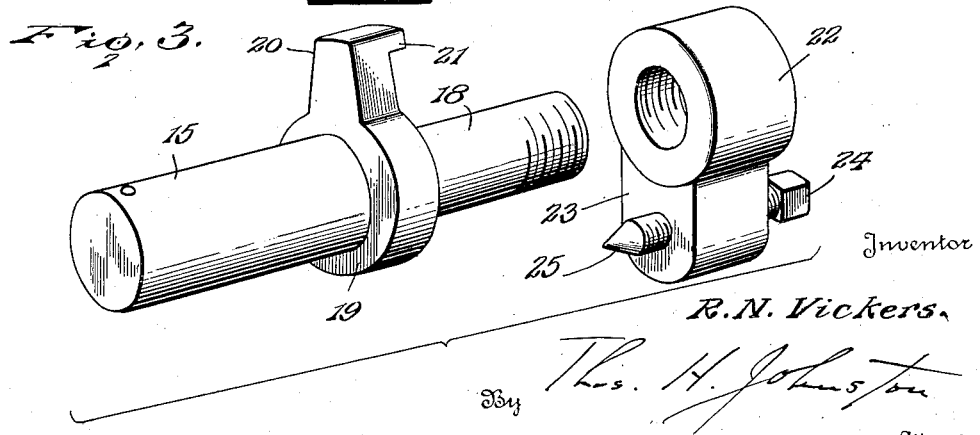

Patented Oct. 1, 1935

2,015,978

UNITED STATES PATENT OFFICE 2,015,978

POSITIVE LOCK WRIST PIN AND CRANK

Richard N. Vickers, Smackover, Ark.

Application September 14, 1934, Serial No. 744,058

5 Claims. (Cl. 74—600)

This invention relates to an improved positive lock wrist pin and crank for oil well rigs and seeks, among other objects, to provide a device wherein not only the spindle of the pin will be locked against rotation but also wherein the nut which secures the spindle will also be locked against loosening so that the pin when once installed will remain rigidly fixed to the crank.

A further object of the invention is to provide a wrist pin wherein the spindle may be slipped into any one of the usual openings in the crank by hand and wherein the spindle may, nevertheless, be rigidly fixed to the crank and locked against accidental loosening, thereby eliminating the necessity for the usual drive fit between the spindle and crank while also adapting the device for use upon cranks which have become cracked.

And the invention seeks, as a still further object, to provide a pin wherein the securing nut for the spindle will be equipped with an integral arm which may be utilized as a lever when applying the nut and wherein said arm will be equipped with a set bolt adapted to have a wedging action against the crank serving to impart a final tightening rotation to the nut, when the set bolt will coact with the crank for rigidly locking the nut against loosening.

Other and incidental objects of the invention not specifically mentioned in the foregoing will appear during the course of the following description.

Figure 1 is an elevation showing my improved wrist pin installed, parts being broken away and shown in section.

Figure 2 is a rear elevation of the upper end portion of the crank showing the manner in which the spindle and nut are locked, and Figure 3 is a perspective view of the wrist pin.

Referring now more particularly to the drawing, I have shown a conventional rig shaft at 9. This shaft is journaled in suitable bearings one of which is indicated at 10 and fixed to the shaft is a crank 11 which is provided with a series of longitudinally spaced openings 12 adapted to selectively receive the crank pin for varying the throw, as will be well understood. Formed on the outer side of the crank at the plane of the openings 12 is a flat longitudinally extending reenforcing rib 13, the longitudinal edges of which provide shoulders 14 lying at opposite sides of said openings.

In conjunction with the crank 11 I employ a spindle 15 equipped at its outer end with a removable pin 16 and washer 17 for connecting the usual pitman with the spindle. Extending axially of the spindle at its inner end is a reduced shank 18 and formed on said spindle at the inner end of said shank is a relatively large annular collar 19. Integral with said collar is a radial arm 20 and extending from said arm in a direction with the shank 18 in spaced parallel relation thereto is a lug 21, the forward edge of which is bevelled. This lug is of a length substantially equal to the width of the shoulders 14 respectively.

Screwed on the free end of the shank 18 is a cylindrical nut 22 and projecting from said nut is a radial arm 23 integral with the nut. This arm is relatively heavy, being of a thickness approximating the width of the nut to provide strength, and screwed through the arm in spaced parallel relation to the axis of the nut is a set bolt 24 provided at its inner end with a smooth conical terminal 25.

The shank 18 of the spindle 15 is adapted to selectively fit in the openings 12 of the crank 11 and in this connection, it should be noted that said shank is of a size such that the shank may be readily fitted through any one of said openings by hand. Under conventional practice, it is customary to provide a drive fit between the crank and pin as a means of rigidly fixing the pin to the crank. Under working conditions, however, the pin becomes loose and even though looseness has developed, it is often quite difficult to remove the pin. Moreover, in any instance where the crank has become cracked, as not infrequently happens, it is difficult to provide a drive fit between the pin and crank such that the pin will be rigidly fixed to the crank. The present invention overcomes these various difficulties.

In installing the pin, the shank 18 is slipped through one of the openings 12 and, at the same time, the lug 21 of the arm 20 is, as shown in Figure 2, arranged in front of one of the shoulders 14 so that the bevelled forward edge of said lug seats flat against said shoulder. In the drawing, the arm 20 is shown as arranged to extend toward the outer end of the crank so that the lug 21 is thus disposed in front of the shoulder at the left of the openings 12, as seen in Figure 2 but, of course, the arm 20 may, if so desired, be arranged to extend toward the inner end of the crank, when the lug 21 will be disposed in front of the shoulder at the right of said openings. The collar 19 is thus permitted to seat flat at its inner face against the boss 13. The nut 22 is then applied and screwed up tightly against the opposite face of the crank for rigidly binding the pin in position on the crank. In thus applying the nut, the arm 23 is utilized as a lever which may be conveniently engaged by a wrench for turning the nut against the crank with extreme tightness. The set bolt 24 is then screwed into an adjacent one of the openings 12 in the crank for rigidly locking the nut against retrograde movement.

In this connection, it is to be noted, as heretofore stated that the lug 21 engages the shoulder 14 at the left of the openings 12, as seen in Figure 2, while the set bolt 24 is disposed to engage the wall of that one of the openings 12 next below the shank 18 at the side of said opening opposite said shoulder. Thus, by providing the set bolt with the conical bolt 25, said terminal is adapted to coact with the wall of said opening, as the set bolt is screwed inwardly, to exert a wedging action on the nut tending to impart a final tightening rotation to the nut, and also hold the lug 21 impinged against the shoulder of the rib to lock the spindle against rotation on the crank.

It will accordingly be seen that the wrist pin is secured to the crank with extreme rigidity. Retrograde rotation of the spindle is prevented by the lug 21 while retrograde rotation of the nut 22 is prevented by the set bolt 24 so that under practical working conditions, the spindle cannot work loose. The relatively large collar 19 provides ample bearing area to coact with the boss 13 at one side of the crank for supporting the pin and as the nut 22 is of approximately the same external diameter, said nut provides a like large bearing area to coact with the crank at its opposite side for rigidly supporting the pin. I therefore provide a particularly simple and effective construction for the purpose set forth as well as a device adapted for installation upon drilling rigs as now in common use.

Having thus described the invention, I claim:

1. In a device of the class described, the combination of a crank, a spindle carried by the crank, a stop rib reinforcing the crank adjacent said spindle, a nut on the spindle securing the spindle to the crank, arms extending radially from the nut and from the spindle, and means carried by the arm of the nut operatively engaging the crank to simultaneously lock the nut and hold the spindle arm impinged against said stop rib to prevent rotation of the spindle on the crank.

2. In a device of the class described, the combination of a crank having a longitudinal stop rib and a plurality of openings extending through said rib, a spindle projecting through one of said openings, a nut on the spindle securing the spindle to the crank, arms extending radially from the spindle and from the nut, and means carried by the arm of the nut operatively engaged with the wall of another of said openings to lock the nut and hold the spindle arm impinged against said stop rib to prevent rotation of the spindle on the crank.

3. In a device of the class described, the combination of a crank having a plurality of openings, a longitudinal stop rib on the crank through which the openings extend, a spindle engaged through one of said openings, an arm carried by the spindle terminally abutting said rib, a nut on the spindle securing the spindle to the crank, and a member carried by the nut spaced outwardly beyond the periphery of the nut and engaged with the wall of another of said openings to lock the nut and hold the arm of the spindle impinged against said stop rib to prevent rotation of the spindle on the crank.

4. In a device of the class described, the combination of a crank having a plurality of openings, a spindle selectively receivable in said openings and engaged in one of the openings, a rib reinforcing the openings and having spaced stop shoulders disposed laterally beyond the openings, an arm on the spindle engageable selectively with said shoulders, a nut on the spindle securing the spindle to the crank, a radially disposed arm on the nut, and an adjustable member on the last named arm adapted to engage the crank to simultaneously lock the nut and hold the spindle arm impinged against one of said stop shoulders to prevent rotation of the spindle on the crank.

5. In a device of the class described, the combination of a crank having a longitudinal stop rib on one face and a plurality of openings extending through the rib, a spindle interchangeably received in said openings and engaged in one of the openings, a nut on the spindle securing the spindle to the crank, radial arms integral respectively with the spindle and with the nut, and a set screw carried by the arm of the nut engaged with the wall of another of said openings to lock the nut and hold the arm of the spindle impinged against said stop rib to prevent rotation of the spindle on the crank.

RICHARD N. VICKERS. [L. S.]